United States Patent [19]

Kesting

[11] 3,957,651

[45] May 18, 1976

[54] MICROPOROUS POLYESTER MEMBRANES AND POLYMER ASSISTED PHASE INVERSION PROCESS FOR THEIR MANUFACTURE

[75] Inventor: Robert E. Kesting, Irvine, Calif.

[73] Assignee: Chemical Systems Incorporated, Santa Ana, Calif.

[22] Filed: Apr. 30, 1975

[21] Appl. No.: 572,887

Related U.S. Application Data

[63] Continuation-in-part of Ser. No. 208,928, Dec. 16, 1971, abandoned, and a continuation-in-part of Ser. No. 347,156, April 4, 1973, abandoned.

[52] U.S. Cl. .............................. 210/490; 210/500 M; 210/31 C; 260/2.5 M; 260/30.4 R; 260/31.2 R; 260/31.2 XA; 260/33.4 R; 264/41; 264/13; 264/46.4; 264/49
[51] Int. Cl.² .................... B01D 39/04; B29D 27/04
[58] Field of Search ................. 264/41, 49, 46.4, 5, 264/13; 210/500 M, 490, 31 C; 260/2.5 M, 30.4 R, 31.2 R, 31.2, 33.4 R

[56] References Cited
UNITED STATES PATENTS

| | | | |
|---|---|---|---|
| 3,423,491 | 1/1969 | McLain et al. | 264/49 |
| 3,654,065 | 4/1972 | Dorogi | 260/2.5 M X |
| 3,674,719 | 7/1972 | Jenkins | 260/31.2 R X |
| 3,682,846 | 8/1972 | Sano et al. | 260/2.5 M X |
| 3,744,642 | 7/1973 | Scala et al. | 210/500 M |
| 3,822,202 | 7/1974 | Hoehn | 210/500 M X |
| 3,877,978 | 4/1975 | Kremen et al. | 210/500 M X |

OTHER PUBLICATIONS

Carothers, Wallace H. and J. A. Arvin "Studies on Polymerization and Ring Formation, II Poly–Esters," in Journal of the American Chemical Society, Vol. 51, Aug. 1929, pp. 2560–2570.

Kesting, Robert E. "Synthetic Polymeric Membranes," New York, McGraw-Hill, 1971, pp. 94, 95, 116–157.

*Primary Examiner*—Philip Anderson
*Attorney, Agent, or Firm*—Knobbe, Martens, Olson, Hubbard & Bear

[57] ABSTRACT

Microporous membrane filters composed of polyesters derived from aromatic dibasic acids and especially polytetramethylene terephthalate are produced. These membranes are produced by a polymer assisted phase inversion process involving casting a solution of the polyester and assisting polymer to form a film, evaporating the solvent to form a membrane having inchoate micropores filled with the assisting polymer and subsequently at least partially leaching out the assiting polymer.

17 Claims, No Drawings

MICROPOROUS POLYESTER MEMBRANES AND POLYMER ASSISTED PHASE INVERSION PROCESS FOR THEIR MANUFACTURE

RELATED APPLICATIONS

This is a Continuation-in-Part of my copending pat. application Ser. No. 208,928, filed Dec. 16, 1971, entitled MICROPOROUS POLYESTER MEMBRANES AND POLYMER ASSISTED PHASE INVERSION PROCESS FOR MAKING SAME, and now abandoned, and of Ser. No. 347,156, filed Apr. 4, 1973, and now abandoned, to which priority is claimed.

This invention relates to microporous membrane filters composed of polyesters derived from aromatic dibasic acids, especially polytetramethylene terephthalate and to a new process for forming microporous polymeric membrane filters. The new process, referred to as a polymer assisted phase inversion, obviates the necessity for a surfactant in the membrane and represents a new approach to the formation of microporous membrane filters.

The technology of synthetic polymeric membranes is quite well developed in many areas and the literature on the subject is profuse. Probably the best and most comprehensive treatment of this subject is the recent work by the present inventor, Dr. Robert E. Kesting, entitled SYNTHETIC POLYMERIC MEMBRANES, McGraw-Hill Book Company, 1971, Library of Congress catalog card No. 72-132345, the entire contents of which are incorporated herein by reference. The reader is referred in particular to Chapter 5 of this work entitled "Porous Phase-Inversion Membranes" for a discussion of the principles of membrane formation Polyester resins and the terephthalate polymers are, in general, well known. Polyesters were described by Carothers and Arvin, Journal of the American Chemical Society, Volume 51, pages 2560–70 in 1929. See also collected papers of W. H. Carothers on High Polymeric Substances, Volume I HIGH POLYMERS, INTERSCIENCE PUBLISHERS INC., New York 1940. Polyethylene terephthalate films have been marketed for several years under the trademark MYLAR by DuPont and other polyester materials in various forms have been available for several years.

One method of forming membranes involves the addition of a material which is soluble in a nonsolvent for the membrane material by mechanical mixing, e.g. shearing action, followed by solvent extraction of the soluble material. Such a method is described by Dorogi, U.S. Pat. No. 3,654,065, Apr. 4, 1972, wherein an aqueous solution of polyvinyl alcohol and a plastisol of e.g., polyvinyl chloride are mixed, formed and washed to provide a membrane. Mechanical intermixing is required in the process and, consequently, uniform membranes having high void volumes and good integrity cannot be formed. Furthermore, only selected materials are amenable to working in such process. It is also known to add nonsinterable additives to granule mixtures used in the preparation of sintered membranes. For example, starch has been added to polyethylene granules, the mixture pressed and sintered, and the starch leached out. See Kesting, SYNTHETIC POLYMERIC MEMBRANES, supra, p. 94. Neither of these methods is applicable to the production of integral, high void volume membranes of the type here disclosed.

Polyester cellular structures, described as barely coherent, which crumbled when handled, can reportedly be formed by dispersing a polyester solution in a nonsolvent immiscible chlorofluorocarbon, cooling the dispersion to the solidification temperature of the chlorofluorocarbon and removing, e.g. by sublimation, the solid chlorofluorocarbon from the solidified dispersion paste. Jenkens, U.S. Pat. No. 3,674,719, July 4, 1972. While this technique may be regarded as an improvement over the simple mechanical mixing techniques, it is difficult and expensive to carry out, requires special refrigeration and vacuum equipment and is limited in its application. For example, coherent, integral, microporous membranes apparently cannot be produced using the dispersion method. In general, the dispersion method lacks the flexibility and reliability of solution methods of membrane formation. Heretofore, however, solution methods could not be applied to the preparation of polyester membranes having integrity and high void volumes.

It is one of the principle features of this invention to provide a solution method for the preparation of integral, high void volume microporous membranes from polyesters. This is a result not heretofore known and a result which apparently cannot be accomplished using prior art techniques.

One principle feature of the present invention is the provision of a dry process for forming integral* microporous membrane filters of aromatic dibasic acid polyesters in which membrane formation is accomplished without the necessity of the usual low molecular weight swelling agents and wetting agents, the polymer formation being assisted by the inclusion of a separate and distinct polymeric compound. This dry process is called a polymer assisted phase inversion process for forming microporous membrane filters of aromatic dibasic acid polyesters and is particularly applicable to polytetramethylene terephthalate and equivalent polyester resins.

*An "integral" microporous membrane has a continuous uniform structure of small open-celled [0.1 to 2.0 micrometer ($\mu$m)] voids without occasional larger voids greater than about 5.0$\mu$m, and is capable of being handled without disintegrating, i.e. is self-supporting. See my copending application Ser. No. 293,943, filed Oct. 2, 1972 INTEGRAL MICROPOROUS HIGH VOLUME POLYCARBONATE MEMBRANES AND A DRY PROCESS FOR FORMING SAME and my publication, Kesting, SYNTHETIC POLYMERIC MEMBRANES, for additional discussion and definitions.

Within these broad and unique principle features of the invention, lie other significant features which will be discussed in detail in the specification hereinafter.

POLYESTERS DERIVED FROM AROMATIC DIBAJIC ACIDS

Polyesters which are derived from aromatic dibasic acids, especially those derived from terephthalic acid, have excellent chemical resistance, including resistance to acid and base hydrolysis and resistance to a great number of organic solvents.

In addition, these resins exhibit other outstanding properties, such as high tensile strength, flexibility, and thermal stability. For these reasons this class of resins represents an excellent a priori candidate for the formation of microporous membrane filters. Until the present invention, however, membranes of these materials which exhibit the structure of the "typical" microporous membrane filters, such as those prepared from nitrate and acetate esters of cellulose, and certain polycarbonates (see the present inventor's copending patent application), etc., have eluded workers in the field.

Polyesters prepared from the condensation of dibasic acids and diols are well known as resins and possess the following general formula:

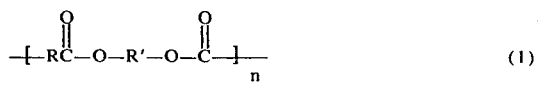 (1)

wherein R is aryl and R' is typically alkyl, wherein n is integer which may be as low as a few hundred to as high as several thousand.

The only polyesters of interest in the present invention are those in which the dibasic acid moiety is aromatic, e.g. the benzene nucleus. The specific dibasic acid of the greatest interest in the present invention is terephthalic acid.

Ortho- and Isophthalic acid derived polymers are regarded as equivalent only in the very broadest sense and only marginally suitable as membrane formers in the present invention.

Polyesters of the class under consideration derived from terephthalic acid have, within the context of the present invention, such unique properties as to set terephthalate resins apart from other resins of this class.

Diols which are suitable for the present invention are the alkyl diols such as trimethylene glycol, tetramethylene glycol, pentamethylene glycol, etc. Ethylene glycol derived polyesters of the class under consideration are regarded as only very marginally suitable, and equivalent to tetramethylene glycol derived polymers only in a broad sense, which would include usable, but much less satisfactory membrane forming systems.

Generally, then, the most suitable polyesters are those having the formula:

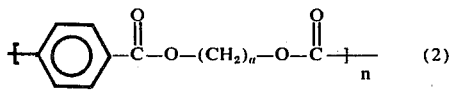 (2)

wherein a is an integer from 3 to 5, most preferably 4, and marginally as low as 2 or as high as 6 or 7, and wherein n is an integer greater than about 45 (MW ≅ 10,000) and preferably greater than 90 (MW ≅ 20,000). The most suitable available range of polymers of this class thus far proved have an n value within n = 90 (MN ≅ 20,000) to n = 225 (MW ≅ 50,000), but the use of such polymers having an n value of up to 450 (MW ≅ 100,000) or higher will predictably permit preparation of High Void Volume membranes by the dry process here disclosed, as well as by the process described in my copending patent application referred to hereinafter.

The range of effective equivalents, for purposes of this invention, must, to some degree, be determined empirically, since a full range of potential equivalents is not now available for evaluation and may not become available soon enough to avoid undue delay in making this technology available to the industry.

Some guidelines to potential equivalents are possible, however. These are outlined briefly below.

Polyesters derived from ortho- or isophthalic acid are regarded as potential, but significantly inferior, marginal equivalents suitable for some applications if the solvating power of the casting solution solvent is reduced and carefully controlled. (For use in the dry process herein disclosed, the solvent must also dissolve the assisting polymer, thus making solvent selection critical and unpredictable).

Polyesters of the class under consideration having the general formula:

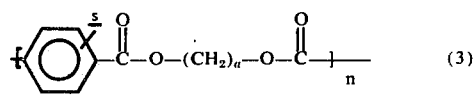 (3)

wherein a and n are the integers as previously defined and wherein s is a substituent which does not prevent polymerization of the polyester, e.g. a methyl or other lower alkyl group (1–4 carbon atoms), are also potential equivalents and should permit the more effective use of diols having 2 carbon atoms. Selection of a solvent having a lower solvating power, as discussed previously is indicated for casting solutions of such polyesters, especially where larger, or plural, alkyl substituents occupy one or more positions on the aromatic dibasic acid nucleus.

Polyesters derived from fused polycyclic dibasic acids, for example

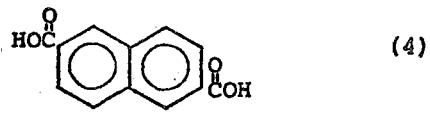 (4)

are not good candidates as equivalents, although the dry process described herein could be used if a suitable solvent could be found.

Polyesters of the class under consideration derived from diols containing etheric linkage, for example

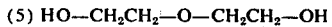

(5) HO—CH$_2$CH$_2$—O—CH$_2$CH$_2$—OH and

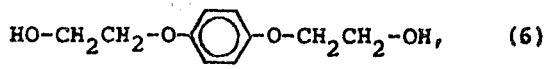 (6)

and from diols of high molecular weight, for example (7) HO—(CH$_2$)$_a$'—OH wherein a' is an integer of 7 or 8 or higher, are also not good candidates as equivalents to the extent that membranes formed from such materials would be less stable, less resistant and generally inferior and would require a different solvent system. The dry process disclosed herein could be used, however, if a suitable solvent could be found.

Obviously, not all criteria for equivalence are set forth, and not all parameters are known. I do not, however, wish to be limited to those materials specifically set forth in the examples, nor do I wish to ignore the fact that one particular combination of materials (polytetramethylene terephthalate polyester, polyvinyl alcohol assisting polymer, and hexafluoroisopropanol) possesses such unexpected advantages as to be a distinct discovery within the broader framework of this invention.

Until quite recently, the only commercially available dibasic acid derived polyesters of the type under consideration here were the polyethylene terephthalate polyesters prepared by the condensation of dimethyl terephthalate and ethylene glycol. (Reference to dibasic acids and diols includes polymerizable derivatives thereof Polymers of this type are sold in various forms under several trademarks including Mylar and Dacron.

I had postulated that if the alkyl chain were longer than that provided by polyethylene terephthalate, polyesters of the type under consideration would be excellent candidates for microporous membrane filter fabrication. I have now proved my postulate correct and discovered that polytetramethylene terephthalate prepared from the condensation of dimethyl terephthalate and 1,4, tetramethylene glycol does indeed form microporous membrane filters having excellent chemical and physical characteristics.

A sufficiently high molecular weight polytetramethylene terephthalate is available from Eastman Chemical Company under the tradename Tenite Polyterephthalate, from General Electric Company under the tradename Valox, and from Celanex under the tradename Celanese.

My familarity with the process variables, the characteristics of the products obtained and the chemical and physical properties of the materials involved indicate with relative certainty that polyesters derived from aromatic dibasic acids (or polymerizable derivatives, e.g. esters, thereof) having 3 to 6 or 7 methylene groups in the alkyl moiety of the polymer can be fabricated into good to excellent quality microporous membrane filters using the techniques and processes of this invention as described hereinafter.

In general, any polyester derived from an aromatic dibasic acid which is insoluble in water, possesses acceptable physical properties (is self-supporting at ambient temperature and is sufficiently dimensionally stable), and is soluble within the range of 2 to 20 percent (by weight) in combination with an assisting soluble polymer which also has solubility in the 2 to 20 percent (by weight) range in a solvent which has a boiling point in the ambient to approximately 150°C range must be regarded as an equivalent in the broadest sense, but not in the narrow sense of being interchangeable with polytetramethylene terephthalate with like results in the same casting solution system. Indeed, I regard only polytrimethylene terephthelate and polypentamethylene terephthalate polyesters as substantially certain to be closely equivalent and functional in this latter sense.

The preferred polyester, polytetramethylene terephthalate, sold under the trademark Tenite Polyterephthalate 6 PRO, has outstanding chemical properties illustrated by Table I which shows the effects of various chemicals on this grade of polytetramethylene terephthalate.

| Chemical | %Increase After One Year In Weight | In Thickness |
|---|---|---|
| Acetic Acid (glacial) | 2.65 | 1.51 |

-continued

| Chemical | %Increase After One Year In Weight | In Thickness |
|---|---|---|
| Acetic Acid (5%)* | 0.40 | −0.29 |
| Acetone | 5.56 | 2.57 |
| Ammonium Hydroxide (Conc.) | 0.80 | −0.16 |
| Ammonium Hydroxide (10%) | 0.49 | −0.53 |
| Aniline | 6.69 | 4.17 |
| Benzene | 3.26 | 2.19 |
| Carbon Tetrachloride | 0.72 | 0.42 |
| Chromic Anhydride (40%) | 0.10 | −0.11 |
| Citric Acid (10%) | 0.37 | 0.16 |
| Cottonseed Oil | 0.09 | −0.16 |
| Alconox Detergent (0.25%) | 0.37 | −0.34 |
| Diethyl Ether | 0.95 | 0.45 |
| Dimethyl Formamide | 2.48 | 1.56 |
| Deionized Water | 0.39 | −0.53 |
| Ethyl Acetate | 3.30 | 1.93 |
| Ethylene Dichloride | 18.66 | 6.16 |
| Heptane | 0.13 | −0.26 |
| Hydrochloric Acid (Conc.) | 0.56 | 0.03 |
| Hydrochloric Acid (10%) | 0.33 | −0.05 |
| Hydrogen Peroxide (28%) | 0.41 | 0.00 |
| Hydrogen Peroxide (3%) | 0.38 | −0.05 |
| Isooctane | 0.08 | −0.08 |
| Kerosene | 0.10 | −0.16 |
| Methanol | 1.61 | 0.16 |
| Mineral Oil | 0.06 | −0.13 |
| Nitric Acid (Conc.) | disintegrated | |
| Nitric Acid (40%) | 0.68 | 0.05 |
| Nitric Acid (10%) | 0.36 | −0.16 |
| Oleic Acid (93%) | 0.26 | −0.18 |
| Olive Oil | 0.06 | 0.11 |
| Phenol (5%in water) | 9.48 | 4.88 |
| Sodium Chloride (10%) | 0.32 | 0.05 |
| Sodium Carbonate (20%) | 0.31 | 0.05 |
| Sodium Carbonate (2%) | 0.36 | 0.00 |
| Sodium Hydroxide (10%) | −1.20 | −1.16 |
| Sodium Hydroxide (1%) | 0.37 | 0.77 |
| Sulfuric Acid (Conc.) | disintegrated | |
| Sulfuric Acid (30%) | 0.25 | −0.52 |
| Sulfuric Acid (3%) | 0.36 | 0.00 |
| Turpentine | 0.27 | −0.03 |
| Toluene | 2.35 | 1.40 |
| Sodium Hypochlorite (3.5%) | 0.37 | −0.11 |
| Ethanol | 0.48 | 0.21 |
| Ethanol (50%) | 0.47 | 0.03 |
| Dibutyl Sebacate | 0.07 | −0.05 |
| Di-2-Ethylhexyl Phthalate | 0.07 | 0.08 |
| Ivory Soap (1%) | 0.37 | 0.08 |
| Brake Fluid | 0.00 | 0.00 |
| Transformer Oil | 0.06 | −0.18 |

All percentages are concentrations in water. These membranes are extremely tough, flexible, dimensionally stable over a broad range of temperatures, maintain their strength at both high and low temperatures and possess other highly desirable physical characteristics.

THE POLYESTER MEMBRANE PRODUCT

In terms of a manufacture or product, the present invention is directed to a polyester derived from a dibasic acid, as discussed hereinbefore, which is in the form of a microporous membrane.

The microporous membrane of this invention is composed of a polyester derived from a dibasic acid and may include a hydrophilic second polymer or a second polymer which is soluble in a fluid which is a non-solvent for the polyester.

Typically, the membrane of this invention, in finished form, is composed of a dibasic acid derived polyester, as discussed previously, and a minor proportion of the second polymer, which is hydrophilic or soluble in a polyester non-solvent fluid, or includes, as a component, such a membrane composition.

The membranes here disclosed may be used as membrane filters in microfiltration, ultrafiltration, in reverse osmosis, as reverse osmosis membranes or as porous support substrates for other reverse osmosis membranes, the cellulose acetate membranes, for example, and in electrophoresis, curtain electrophoresis, thin layer, gas and liquid chromatography and as substrates to which enzymes and other catalysts can be attached for solid-liquid reactions. The porous membrane filters in this invention may be produced in flat sheets, tubular forms on the inside or the outside of the tube, as hollow fibers, and in microporous bead configurations These microporous membrane filters are of special significance to the production of microporous tapes because of their strength and flexibility.

One particularly unique advantage of the subject membrane system results from the fact that the assisting polymer fills the incipient voids in the unleached membrane. The surface of the unleached membrane is, therefore, still amenable to fabrication of multilayered membrane structures, with one membrane layer being used as the substrate for the next layer. This permits, inter alia, production of very thick membrane sections.

Other advantages possessed by the membranes of this invention are the absence of surfactants and of a tendency to build up static charges which, in conventional microporous membranes, tracks dust and makes handling difficult and results sometimes uncertain.

Other and more specific characteristics of the product will be apparent from the discussion of the process which follows and from the subsequent references to the product.

THE POLYMER ASSISTED PHASE INVERSION PROCESS

These membranes are fabricated by forming a casting solution of a dibasic acid derived polyester, a second polymer which is soluble in a fluid which is a non-solvent for the polyester, and a liquid which is a solvent for both the polyester and the second polymer. This forms the casting solution for forming the membranes. The casting solution is then cast upon a substrate to form a film of desired dimensions. The solvent is permitted to evaporate from the film and at least a portion of the second polymer is leached from the film with the fluid which is a non-solvent for a polyester. This leaves a microporous membrane which has excellent chemical and physical characteristics, the characteristics of which can be varied by controlling the nature and amount of the second polymer in the membrane, as well as by the selection of the polyester, and by control of process variables.

Polytetramethylene terephthalate is considered to be the first truly suitable aromatic dibasic acid based polyester for formation of microporous membrane filters because of its greater solubility (compared to polyethylene terephthalate) in suitably volatile solvents. This property makes it possible to prepare true, molecularly dispersed, solutions of polytetramethylene terephthalate in a few selected volatile solvents. Polytetramethylene terephthalate is more soluble (i.e. exhibits a higher degree of dispersion), than polyethylene terephthalate, probably because of the greater flexibility of the polymer chains, owing to the presence of four methylene groups in the former, rather than the two separating the terephthalate acid moieties in the latter.

Further, and of distinguishing importance, polytetramethylene terephthalate represents a very close approach to, if not the actual accomplishment of, the ideal balance between sufficient solubility to permit fabrication into membranes, and sufficient solvent resistance, to permit utilization of the resultant membrane in the filtration of solutions in common organic solvents. By comparison, polyethylene terephthalate is insufficiently soluble to permit fully satisfactory membrane fabrication. On the other hand, the inclusion of too many or too large substituents on the aromatic nucleus of the diacid or too long methylene chains or etheric links in the diol, or other substitution or modification which greatly increases the solubility of the polyester degrades the chemical and physical resistance of the resultant polyester and may require significant modification of the membrane fabrication process.

The first partially successful prototype membranes prepared according to this invention were from polyethylene terephthalate solutions. Such solutions are turbid, whereas polytetramethylene terephthalate solutions are clear, indicating a finer dispersion in the latter solutions. Fine dispersion in the solution, and hence optically clear solutions, are highly desirable and are probably mandatory in any commercially feasible process, since only the latter optically clear casting solutions are sufficiently stable for utilization in the dry phase inversion process on a commercial scale.

The reader is referred to Kesting, SYNTHETIC POLYMERIC MEMBRANES, referenced previously, and my copending application entitled INTEGRAL UNSKINNED HIGH VOID VOLUME POLYCARBONATE MEMBRANES AND A DRY PROCESS FOR FORMING THE SAME, Ser. No. 190,415 filed Oct. 18, 1971 and now abandoned, for a detailed discussion of the phase inversion process for fabricating polymeric membranes. The broad principles of phase inversion membrane formation are applicable to the present dry process; however, the present process is believed to be the first satisfactory example of a phase inversion process for manufacturing microporous membranes in which the swelling agent consists of a solvated second polymer which assists in the phase inversion in a manner similar to the manner in which typical swelling agents of low molecular weight assist in the phase inversion in common phase inversion membrane formation. For this reason, the process is referred to as a Polymer Assisted Phase Inversion Process, sometimes abbreviated "PAPI" process.

The process consists in dissolving the polyester and one or more, usually only one, second polymer(s) in a volatile solvent, (i.e., a solvent which has a boiling point below about 150°C and preferably below about 100°C) or in a combination of solvents, swelling agents and non-solvents, casting the solution as a film, and evaporating the solvents from the solution. The process can be either wet or dry; that is, it may involve either partial or complete evaporation, the dry process being preferred whenever applicable.

The overall process involved herein is described as a polymer assisted phase inversion process but it has elements of a leaching process as well. In those cases where a non-polyester polymer component is either desired or does not interfere with the end use of the filter, these non-polyester polymer components may simply be left in the membrane. In cases where the second polymer, i.e., the non-polyester polymer, would be objectionable, the second polymer may be leached out with a solvent for the second polymer which is a non-solvent for the polyester.

The process may be varied to form polymeric microporous membrane filters for specific end uses. For use in microfiltration, ultrafiltration and electrophoresis, curtain electrophoresis, gas, liquid and thin layer chromatography, an unskinned (i.e., a more or less symmetrical membrane) is desired. In these cases the dried membrane may be either leached of its non-polyester component or components or may be used with the second polymer in place, depending upon the specific requirements of the end use. It is also possible where two or more second non-polyester polymers have been included, to leach one or more of the polymers from the membrane, leaving behind one or more polymers together with a polyester.

Likewise, it is possible to employ in situ cross linking to permanently fix one or more otherwise leachable second polymeric components in the membrane.

Included second polymers may function to improve wettability of the polyester in one of several ways. They may be surfactants or they may simply possess an affinity for water, up to and including water solubility. Where the included polymers are not actually surfactants an important new dimension has been added to membrane filters, since the presence of surfactants, present in commercially available membrane filters, is often deleterious to certain biological separations, and in handling foodstuffs, water for drinking purposes, etc. Therefore, one important feature of the invention is that wettability can be obtained by the inclusion of either leachable or, when necessary non-leachable hydroscopic, but not surface active, polymers.

Two types of asymmetric, i.e., skinned, reverse osmosis membranes and two separate processes for their preparation have been described. These are the Loeb-Sourirajan wet process and the Kesting dry process. Both of these processes use cellulose acetate polymers in their manufacture.

Cellulose acetate is, however, rather friable microporous membrane configurations. Stronger and less friable reverse osmosis membranes are, therefore, desirable.

This difficult goal is accomplished, in the present invention, by casting a membrane either a thin dense or a thicker asymetric membrane, of cellulose acetate or other polymer (such as the polyester itself), suitable for reverse osmosis upon the polyester membranes prior to leaching, so that the polyester membrane after leaching serves as a porous backing support for the cellulose acetate or other reverse osmosis polymeric membrane. Adhesion of the reverse osmosis membrane to the microporous support can be acheived by including, as a constituent of the casting solution for the reverse osmosis membrane, a solvent of the polyester. When properly balanced (containing the correct amount of polyester solvent), this solvent system will sufficiently soften the surface of the polyester to permit good adhesion without destroying the porous characteristics of the polyester membrane support. Following the application of the second layer, the leachable assisting polymer of the substrate may be removed by washing with water, alcohol or other polyester non-solvent.

It is noteworthy also that dense polyester membranes themselves have the ability to function as reverse osmosis membranes, as do asymmetric polyester membranes having a dense skin on a porous substructure.

SOLVENTS

Solvent selection is extremely critical. Indeed, to date only two solvents, hexafluoroisopropanol and trifluoroacetic acid, are known to be acceptable for the dry process. The wet process is less desirable but the same solvents can be used in such a process.

There are no known equivalent solvents for use with polytetramethylene terephthalate polyester of suitable molecular weight for membrane fabrication, and one has little basis for making reliable predictions as to potentially equivalent solvents. Probably only highly fluorinated substituted low molecular weight (1–4 carbon atom) alcohols, acids, ethers, esters and acids can now be considered as solvent candidates in the preparation of the subject membranes, and it is known that not all such compounds are satisfactory. Trifluoroethanol and the hexafluoroacetone-methanol hemiacetal, for example, are not satisfactory solvents for fabricating polytetramethylene terephthalate membranes. Indeed, even trifluoroacetic acid is so vastly inferior to hexafluoroisopropanol as to make the latter a component of a distinct discovery within the broad inventive concept here disclosed.

It may be suggested that where less solvating power is required, as with substituted aromatic dibasic acid or longer chain diol derived polyesters, other highly fluorinated compounds of the class discussed would be suitable, but ultimate solvent selection must, at present, be on an empirical basis.

Any desired solvating power, within the range of the solvents, may be obtained by mixing selected solvents. Hexafluoroisopropanol and trifluoroacetic acid, for example, may be mixed or diluted with other solvents of the class under consideration.

It must be understood that solvent selection is not alone a function of the nature of the polyester. The nature of the assisting polymer and, more correctly, the nature of the combination of polyester and assisting polymer are also controlling, or at least very influential in solvent selection.

ASSISTING POLYMERS

Suitable second or "assisting" polymers are very rare. They include certain hygroscopic polymers, polyvinyl alcohol in particular, Polyvinyl pyrrolidone also functions, but is much less suitable than polyvinyl alcohol. These polymers can be softened and/or leached in water. Other polymers which are soluble in a mutual solvent with themselves and the subject polyesters, and which are soluble in a polyester non-solvent are candidates as assisting polymers.

In a more general sense the assisting polymers must be soluble in a solvent fluid which is a non-solvent for the polyesters and must also be soluble in a mutual solvent for themselves and the polyesters.

Mutual solubility of the type discussed here, in approximately equal weights of the polyester and the assisting polymer at the high total solids content, i.e., between approximately 5 to 20 percent, necessary for the practical production of membranes is extremely rare in most solvent systems and is made possible by the unusual solvent properties of the polar fluorinated compounds which are employed as mutual solvents. Because of strong solvation, solvated chains of dissimilar polymers are apparently much less incompatible than they would be in the absence of solvation.

The void volume of the membrane produced by the polymer assisted phase inversion process can be controlled by varying the ratio of the second (leachable) polymer to the polyester. The higher the ratio, the higher the void volume. For the polytetramethylene terephthalate polymers of the molecular weights available today, e.g., from about 25,000 to 50,000, void volumes above about 60 percent are not achievable with the maintenance of the excellent physical properties found to date. It is to be predicted, however, as higher molecular weight polyesters become available higher void volumes will be achievable using the polymer assisted phase inversion process.

The pore size and void volume of the membranes can be controlled by controlling the nature of the second, "assisting," polymer. The most suitable assisting polymer found to date, is polyvinyl alcohol.

Pore size is a function of the molecular weight and acetyl content of the assisting polymer. High (37–42 percent by weight) acetyl content (e.g. Gelvatol 40-10) polyvinyl alcohols yields coarse structures. Low (0–4 percent by weight) acetyl content resins (e.g. Gelvatol 1-30 and 1-60) yield fine structures. Intermediate size structures (void and pore size ~0.05$\mu$m to ~0.2$\mu$m) are obtained with intermediate (19.5–22.7 percent by weight) acetyl content (e.g. Gelvatol 20–30 and 20–60). Fineness also increases with increasing molecular weight although less dramatically than with decreasing acetyl content. In general the best physical properties are obtained by employing resins of intermediate (20 ± 5 percent by weight) acetyl content and intermediate (10,000 to 14,000) molecular weight (e.g. Gelvatol 20–30) resins.

Polyvinyl pyrrolidone also functions as an assisting polymer, but gives such vastly inferior process and product result, as compared with polyvinyl alcohol, as to make the use of the latter material a distinct and very superior discovery within the broad concept of the invention.

EXAMPLES

EXAMPLE I

A solution consisting of 5 percent by weight, Eastman Tenite Polyterephthalate 6 PRO polytetramethylene terephthalate, 5 percent Monsanto Gelvatol 20–30 DP polyvinyl alcohol, and 90 percent hexafluoroisopropanol was cast on a glass plate to a thickness of 0.020 inches and dried to completion. The result was a 0.003 inch thick microporous membrane which was rapidly wet by water which rapidly leached the polyvinyl alcohol from the membrane.

The membrane was homogeneous, opaque, strong and flexible. It exhibited essentially the same solvent resistance as the bulk form of the material and is, therefore, applicable to filtrations in aqueous and in non-aqueous media. The pore sized distribution was very narrow, with a median value of about 0.1 $\mu$m (a bubble point of about 90psi)* The final membrane was a highly satisfactory unskinned microporous membrane filter having physical and chemical characteristics vastly superior to cellulose acetate and other membranes which have been previously reported. These homogeneous unskinned membranes are useful in microfiltration, ultrafiltration and electrophoresis, curtain electrophoresis, and in gas, liquid and thin layer chromatography. For example, in electrophoresis a membrane produced the standard 5-line (albumin, $\alpha_1$, $\alpha_2$, $\beta$ and $\gamma$) spectrum for serum proteins. The application artifact was small and outside of the spectrum when used with the Beckman Microzone cell (see, Microzone Electrophoresis System Brochures of the Beckman Instrument Company, Fullerton, California).

*The bubble point of a membrane is a means of determining pore size. See ASTM D-2499 which discusses the essential relationship between pressure, surface tension of a wetting fluid, and pore diameter. This relationship predicts that a wetted membrane with applied differential air pressure will permit no flow of presures below a critical level referred to as the "bubble point." At the bubble point, wetting fluid in forced out of the smallest pores and flow thus begins. With pore size measured in micrometers ($10^{-6}$ meters), pressure, P, measured in pounds/square inch, and with kerosene as the wetting fluid, the relation between the pore size and pressure is $\mu = 12.5/P$.

EXAMPLE II

A solution consisting of 5 percent Eastman Tenite Polyterephthalate 6 PRO polytetramethylene terephthalate, 5 percent polyvinylpyrrolidone (molecular weight approximately 10,000) and 90 percent hexafluoroisopropanol was cast to a thickness of 0.020 inch on a glass plate and evaporated to dryness. The resultant membrane consisted essentially of a porous polyester substructure whose pores were filled with polyvinylpyrrolidone. A 1 percent solution of cellulose acetate in a solvent consisting of 49.5 percent hexaflouroisopropanol and 49.5 percent methylene chloride was cast on top of the unleached polyester membrane, forming a thin adherent cellulose acetate film. The composite membrane consisting of a cellulose acetate skin and a porous polyester support was strong and flexible and was found suitable for reverse osmosis applications. The polyvinylpyrrolidone was leached from the polyester membrane as in Example I.

EXAMPLE III

A solution consisting of 5 percent Eastman Tenite Polyterephthalate 6 PRO polytetramethylene terephthalate, 5 percent polyvinyl alcohol Gelvatol 20–60 (molecular weight approximately 86,000), acetyl content approximately 20 percent), and 90 percent hexafluoroisopropanol was cast to a thickness of 0.020 inch on a glass plate, and forcibly evaporated with a stream of hot dry air from a hair dryer. The resultant membrane was asymmetric as evidenced by the presence of a glossy skin which would not wet when a drop of water was placed thereupon and a matte finish, porous substructure which readily wet. This membrane was suitable for reverse osmosis and yielded a product flux of 2 gfd (gallons /ft² day) and 28 percent salt rejection from a 5,000 ppm NaCl feed solution at 800 psi and 25°C.

EXAMPLE IV

A solution consisting of 5 percent Eastman Tenite Polyterephthalate 6 PRO polytetramethylene terephthalate, and 95% hexafluoroisopropanol was cast and allowed to evaporate completely yielding a gray dense membrane 0.001 inch thick. This membrane was utilized in liquid permeation as follows: A charge containing 95 percent methane and 5 percent n-pentane at a temperature of −150°C and a differential pressure of 3 psi was found to permeate the membrane at a rate of 144 grams/ft² hr yielding a permeate containing 98.5 percent methane and 1.5 percent n-pentane. Such membranes are especially useful for this application when formed into the hollow fiber configuration.

EXAMPLE V

A solution containing 0.5 to 1.0 percent Eastman Tenite Polyterephthalate 6 PRO polytetramethylene terephthalate and 0.5 to 1.0 percent polyvinyl alcohol Gelvatol 20–30 and 98 to 99 percent hexafluoroisopropanol was sprayed from an aspirator nozzle to yield fine droplets which quickly dried to a fine powder which when leached with water yielded microporous beads suitable for use in column chromatography for separation of, e.g., protein solutions. If denser powders or powders are desired, higher concentrations (similar to that described in Example I) may be employed.

EXAMPLE VI

The solution described in Example I was cast 0.020 inch thick onto a Mylar backing yielding, after leaching, a microporous membrane intimately bonded to the Mylar. This supported membrane yielded the typical 5 line spectrum for serum proteins when employed in the Beckman Microzone Electrophoresis System and was also suitable for thin layer chromatography.

EXAMPLE VII

The solution described in Example I was cast 0.020 inch thick on a glass plate and allowed to dry completely at which time another membrane was cast on top of it and allowed to dry completely. By repeating this procedure three times a 0.009 inch thick membrane was produced. This process can be repeated as many times as necessary to produce a membrane with any desired thickness. Moreover, a membrane of e.g. coarse porosity can be coated onto one of fine porosity to produce a laminated prefilter-filter composite membrane in one piece. Laminates of dense membranes with porous membranes have been described in Example II.

GENERAL DISCUSSION

Microporous membranes suitable for ultrafiltration, microfiltration and electrophoresis, reverse osmosis, liquid permeation, curtain electrophoresis, gas, liquid and thin layer chromatography, are fabricated from polyesters produced by the condensation or aromatic dibasic acid and alkyl diols by a polymer assisted phase inversion process.

The limitations of the polyesters are that they must have at least as great a flexibility and solubility as polyethylene terephthalate and preferably the degree of flexibility and solubility possessed by polytetramethylene terephthalate. The polyesters must be formed from the condensation of an aromatic dibasic acid and a diol, polyesters formed by the condensation of an aromatic diol and a alkyl dibasic acid being unsatisfactory. Molecular weights in the range of 25,000 to 35,000 are quite suitable but the molecular weight range is not so critical as in phase inversion processes employing low molecular weight swelling agents. The polyester must be soluble to the extent of at least about 0.5 percent by weight and preferably greater than 1 percent or 2 percent by weight in a fluorinated compound such as hexafluoroisopropanol or trifluoroacetic acid.

The second (phase inversion assisting) polymer must be mutually soluble together with the polyester in one or more of the fluorinated solvents and must also be soluble in the polyester non-solvent. The assisting polymer must be mutually soluble in one of the fluorinated solvents to at least about 0.5 percent by weight and preferably greater than 1 or 2 percent by weight in an amount nearly equal to or greater than the weight of the polyester which is dissolved in the casting solution. The solubility of the assisting polymer in the polyester non-solvent may be less or more than its solubility in the polyester solvent, depending upon the end use characteristics. For some end uses, only gross swelling of the second polymer is sufficient "solubility" where the second polymer is to remain in the membrane. In other instances, where the second polymer is to be removed essentially completely from the membrane, the second polymer must be highly soluble in the polyester nonsolvent. There is no known reason other than the improbability of compatibility why 2, 3 or even more "second" polymers may be included, along with the polyester, in the casting solution, although such systems have not been explored. One or more of these may be leached out by appropriate selection of non-solvents for the polyester but which are solvents of selected strength for the second polymer which is to be leached. The nature of the second polymer, e.g. polyvinyl alcohol, can be varied, e.g. as to molecular weight and acetyl content, to influence the pore and void size and physical properties.

The water soluble polymers, polyvinyl alcohol and polyvinyl pyrrolidone especially the former, are of greatest interest simply because of the great utility of aqueous leaching media industrially, clinically, and in the laboratory, but the invention is not limited to the use of second polymers which are soluble in water or other hydroxyl containing solvents, and suitable second polymers may be selected on the basis of solubility as set forth hereinbefore.

Only hexafluoroisopropanol and trifluoroacetic acid are known to be entirely satisfactory casting solution solvents, i.e., have adequate solvent strength for polyesters and for the second polymers, proper boiling point and volatility, and result in strong coherent microporous membranes. However, the various hydrates of hexafluoroacetone may also be acceptable under certain extreme conditions.

The casting solution for forming the microporous membranes of this invention should contain at least about 2 and preferably from 5 to 20 percent by weight, of the resins, i.e., the total polyester and second polymer resin content should be, preferably, greater than 5 percent by weight of the casting solution. Typically, no surfactant is required in the casting solution, thus obviating many of the difficult problems which have plagued manufacturers and users of microporous membranes in the past.

Extreme care and highly controlled evaporation and casting conditions are required to form even moderately satisfactory microporous membranes using polyethylene terephthalate; however, casting solutions of polytetramethylene terephthalate are highly stable and the constitution of these casting solutions can vary over a wide range of concentration and the casting can be performed under a broad range of temperatures and atmospheric conditions. It is usually desirable for health and economic reasons to cast the microporous membranes in an enclosed hood system to prevent exposure to the solvents and to permit recovery of the solvents for reuse. Other than these fairly simple precautions, no critical casting or process conditions have been observed.

Leaching of the second polymer can be done simply by immersing the membrane in the leaching solvent, e.g., water or an aqueous solution. Leaching will, of course, be accelerated when the leaching solution is agitated to provide constant washing of the membrane. Time, temperature and process variables do not appear to be critical in either the casting or the leaching process.

Casting as used here includes the formation of any large surface area configuration, such as sheets, rib-

SUMMARY

A fundamental polymer assisted phase inversion process has been discovered and disclosed which includes the following steps: a solvent resistant polymer, for example the polyesters discussed herein, and an assisting polymer are dissolved in a mutual solvent to a weight percent concentration of from about 2 percent to about 20 percent to form a membrane casting solution. The casting solution is dried under conditions such that a large surface area is exposed, e.g. in the form of a thin film or small particles. The mutual solvent can be extracted in other ways also, as in the well known wet process. This results in a membrane (using the term broadly to include small particles such as chromatographic micro-spheres) in which the inchoate voids in the solvent resistant polymer phase are filled with the assisting polymer. The membrane is then exposed to a solvent (in the broad sense discussed previously) for the assisting polymer which is a non-solvent for the solvent resistant polymer. This exposure may only solvate or swell the assisting polymer, but in most practical applications the assisting polymer will be leached partially or completely from the membrane to leave finished porous membrane. This leaching may be performed in preparation for use or as an incident to the desired end use.

Another fundamental discovery here disclosed is a polyester membrane composed of a polyester having the following general formula

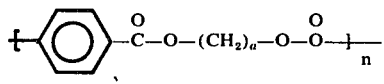

wherein a is an integer from 2 to 7, preferably 3 to 5, and n is an integer from about 45 to greater than 225 (corresponding to a molecular weight of from about 10,000 to about 50,000) and preferably between about n=90 and n=225 (MW≅20,000 to MW≅50,000).

Lying within, and exemplifying, the fundamental process discovery is a process for forming polyester membranes which could not have been expected or predicted even if the more fundamental process had been known previously. According to this process, a polyester having the formula

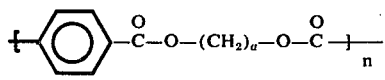

wherein a is from 3 to 5 and n is preferably from 90 to 225 or greater and an assisting polymer selected from the group consisting of polyvinyl alcohol and polyvinyl pyrrolidone or mixtures of these are dissolved to a total weight percent of from 2 to 20 percent (preferably about 5 percent) in a solvent which consists essentially of (i.e. the solvating power for the polymers of interest is not substantially reduced by diluents) hexafluoroisopropanol, trifluoroacetic acid or mixtures of these solvents. The polyester and assisting polymers are present in approximately equal volume percent (of the dry membrane) concentrations in the casting solution; i.e. the polyester and assisting polymer are present in about 50 v/o ± 10 v/o concentrations in the membrane as cast, before leaching. Generally, there will be a greater amount of assisting polymer in the casting solution on a volume percent basis. The process is carried out as in the fundamental process. It is recognized that the foregoing may be the only possible examples of the fundamental process, but this has not been established.

Within the foregoing exemplification of the fundamental process is a particular process which is so unexpectedly and strikingly superior that it constitutes a distinct major discovery which will have far reaching scientific and industrial consequences. It has been discovered that one, and only one, combination of constituents, when used in the polymer assisting phase inversion process under consideration, gives greatly superior results with greatly reduced process problems and significantly increased reliability. These constituents are: polyester:

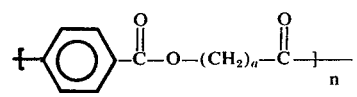

wherein a is 3 to 5 (preferably 4) and n is 90 to 225.
  assisting polymer: polyvinyl alcohol having a molecular weight of from about 5,000 to about 25,000 (10,000 to 14,000 preferred) and an acetyl content of from 0 to about 50 percent (15 to 25 percent preferred).
  mutual solvent: hexafluoroisopropanol
  leaching solvent: water (or any solvent for polyvinyl alcohol which is a non-solvent for the polyester).

Of these constituent materials, only the leaching solvent is not critical to the achieving of the vastly superior results obtainable by this process.

The product of the foregoing superior process, i.e. the resulting polyester membrane, constitutes a distinctive and unique discovery not expected and incapable of prediction, even in view of the more fundamental discoveries.

It is apparent, then, that this invention is both general and specific. It is general in the sense of the more fundamental aspects of the process and resulting polyester membrane. It is specific with respect to the unique, unexpected and superior results (as compared with the more general results) which accrue from using the particular combination of the indicated polyester, polyvinyl alcohol and hexafluoroisopropanol in the process.

When polyvinyl alcohol is used in and absence of a volatile swelling agent, the membrane which results after drying is initially a dense film consisting of two interconnecting networks of polyester and polyvinyl alcohol. To produce a microporous member, all or part of the polyvinyl alcohol network is leached out of the polyester matrix by washing with water. This water wash represents an additional fabrication step above and beyond what is required for a dry process wherein no washing is required. The washing step can be eliminated. i.e., microporous membranes can be produced directly in the complete evaporation step, if a volatile swelling agent is included in the casting solution in place of all or a portion of the nonvolatile polyvinyl alcohol. The swelling agents of most practical value are those which will hydrogen bond or otherwise associate with the fluorinated solvents described hereinbefore such that the swelling agent is removing a portion of the solvent power of the fluorinated solvent, but not enough to cause incompatibility in the overall solution. By thus removing a portion of the solvent power of the solvent, the swelling agent causes the polymer to gel at an earlier stage in the evaporation process than would have been the case had there been no swelling agent present. In effect this means that the nascent membrane solidified before it has lost its porosity. In the absence of the swelling agent the membrane would densify.

There are several requirements for acceptable swelling agents:

1. They must be capable of hydrogen bonding or otherwise associating with the fluorinated solvents. Molecules with receptive sites such as oxygen, double bonds, amine or nitrile groups are useful.

2. The boiling points of the swelling agent or of the swelling agent-fluorinated solvent complex must be higher than that of the fluorinated solvent. Ideally the boiling points should be at least 30° to 40°C higher. If a strong high boiling complex exists between the fluorinated solvent and the swelling agent which persists during evaporation, then the boiling point of the swelling agent need not itself be higher than that of the solvent. For example, hexafluoroisopropanol and tetrahydrofuran form a stable 1:1 complex with a boiling point of 100°C even though tetrahydrofuran itself boils at 64°–66°C.

It should therefor be borne in mind that while the polymer assisted phase inversion process described here is unique and possesses certain advantages, it is not the only way the membranes of the invention can be prepared. For example, a casting solution consisting of 8 percent Eastman Tenite polyterephthalate 6 Pro polytetramethylene in 1:1 tetrahydrofuran and hexafluoroisopropanol or 1:1 tetrahydrofuran and trifuloroacetic acid will give quite satisfactory results when prepared and cast as described herein.

EXAMPLE SOLUTIONS

Solution (a):
  Polymer: Eastman Tenite Polyterephalate Grade 6P20 5 grams
  Solvent: Hexafluorisopropanol HFIP - 92 grams
  Polyvinyl alcohol: Monsanto Gelvatol Grade 20-30 -1.25 grams
  Swelling agent: Tetrahydrofuran - 6 grams
Solution (b):
  Polymer: Eastman Tenite Polyterephalate Grade 6P20 - 6 grams
  Solvent: Hexafluorisopropanol HFIP - 92 grams
  Polyvinyl alcohol: Monsanto Gelvatol Grade 20 -30 -1.5 grams
  Swelling agent: Tetrahydrofuran - 6 grams
Solution (c):
  Polymer: Eastman Tenite Polyterephalate Grade 6P20 - 6 grams
  Solvent: Hexafluorisopropanol HFIP - 92 grams
  Polyvinyl alcohol: Dupont Elvanol 5105 - 2 grams
  Swelling agent: t-amyl alcohol - 10 grams
Solution (d):
  Polymer: Eastman Tenite Polyterephalate Grade 6P20 - 6 grams
  Solvent: hexafluorisopropanol HFIP - 92 grams
  Polyvinyl alcohol: Dupont Elvanol 5105 - 2 grams
  Swelling agent: Tetrahydrofuran - 6 grams
Solution (e):
  Polymer: Eastman Tenite Polyterephalate Grade 6P20 - 6 grams
  Solvent: Hexafluorisopropanol HFIP - 92 grams
  Polyvinyl alcohol: Monsanto Gelvatol 2060 - 1.5 grams
  Swelling agent: t-amyl alcohol - 7.5 grams Solutions (a) – (e) were cast 0.018 to 0.020 inches thick on glass and allowed to evaporate completely resulting in opaque white membranes identified respectively below as membranes (a) – (e).

The microporous membranes were wet with kerosene and the bubble points were determined. The pore diameters in micrometers um were then determined utilizing the equation:

$$\text{Pore size (um)} = \frac{12.5}{\text{bubble point in psi}} \quad \text{cf. ASTMD-2499}$$

The results are tabulated below.

| Membrane | Bubble Point (psi) | Pore Size (um) |
|---|---|---|
| (a) | 5 | 2.5 |
| (b) | 6 | 2.1 |
| (c) | 9 | 1.4 |
| (d) | 22–23 | 0.56 |
| (e) | 48–50 | 0.256 |

Thus, by increasing the concentration of polymer and decreasing or eliminating the polyvinyl alcohol concentration, asymmetric membranes can be produced which are suitable for ultrafiltration.

The invention is defined, not by the examples, but by the claims and many variations are possible within the scope of the claims.

What is claimed is:

1. An integral microporus membrane having inchoate pores which are at least partially filled with an assisting polymer, the membrane consisting essentially of a polyester resin of the general formula:

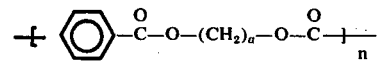

wherein a is an integer of from 3 to 7 and n is an integer greater than about 45, and wherein the assisting polymer is soluble in a solvent which is a nonsolvent for the polyester.

2. The membrane defined in claim 1 wherein the assisting polymer consists essentially of the polyvinyl alcohol or polyvinyl pyrrolidone.

3. The membrane set forth in claim 2 wherein the polyvinyl alcohol has a molecular weight of from about 5,000 to about 25,000 and an acetyl content up to about 50 percent.

4. The membrane set forth in claim 1 wherein a is 3, 4 or 5.

5. The membrane set forth in claim 4 wherein a is 4.

6. An integral microporous polyester membrane prepared by the process comprising the steps of casting a solution consisting of a polyester resin having the general formula:

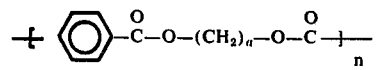

where in a is an integer of from 3 to 7 and n is an integer greater than about 45 and an assisting polymer, in concentrations of from about 2 percent to about 20 percent by weight of total polymer in a mutual solvent for the polymers onto a substrate to form a film and extracting the mutual solvent for the polymers from the film to thereby form a membrane of similar configuration, the membrane having inchoate pores filled with the assisting polymer, and leaching at least some of the assisting polymer from the pores by exposing the membrane to a solvent for the assisting polymer which is a nonsolvent for the polyester.

7. The membrane claimed in 6 wherein a is 3, 4 or 5.
8. The membrane defined in claim 6 wherein a is 4.
9. The membrane defined in claim 6 wherein the assisting polymer is polyvinyl alcohol or polyvinyl pyrrolidone.
10. An integral microporous polyester membrane prepared by the process comprising casting a solution containing a polyester resin having the general formula:

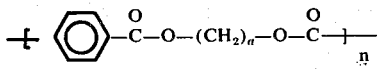

wherein a is an integer of 3 to 7 and n is an integer greater than about 45 in concentrations of from about 2 percent to about 20 percent by weight of total polymer in a solvent for the polymer upon a substrate to form a film and extracting the solvent from the film to thereby form a membrane.

11. A casting solution for forming microporous membranes consisting essentially of a polyester derived from the condensation polymerization of terephthalic acid or an ester of terephthalic acid with a 3 to 7 carbon atom containing alkyl diol and hexafluoroisopropanol or trifluoroacetic acid or mixtures of hexafluoroisopropanol and trifluoroacetic acid.

12. The casting solution defined in claim 11 containing polyvinyl alcohol, polyvinyl pyrrolidone or tetrahydrofuran.

13. A polymer assisted phase inversion process for forming integral microporous membranes, comprising the steps of:

forming a solution of a solvent resistant membrane forming polyester resin derived from the condensation polymerization of terephthalic acid or an ester of terephthalic acid with a 3 to 7 carbon atom containing alkyl diol and an assisting polymer in a mutual solvent for said polymers;
casting said solution upon a substrate to form a film; and
evaporating the mutual solvent from said cast film to form a membrane having generally the same configuration as the substrate and having inchoate micropores filled with the assisting polymer, the assisting polymer being soluble in a solvent which is a non-solvent for the solvent resistant polyester.

14. The process for forming integral membrane constructions comprising the steps of:
casting a membrane from a solution containing a solvent resistant polymer and an assisting polymer to form a membrane having inchoate pores filled with the assisting polymer; and
casting at least one additional layer of polymer from a solution onto the membrane formed in the preceding step.

15. A microporous powder product comprising beads formed by spraying a solution consisting of polyester resins derived from the condensation polymerization of terephthalic acid or an ester of terephthalic acid with a 3 to 7 carbon atom containing alkyl diol and an assisting polymer in a mutual solvent for said polymers to form fine droplets and allowing the droplets to dry into a fine powder, said assisting polymer being soluble in a solvent which is a non-solvent for the polyester resin and thereafter leaching the assisting polymer.

16. A method for forming microporous beads comprising the steps of spraying a solution consisting of polyester resins derived from the condensation polymerization of terephthalic acid or an ester or terephthalic acid with a 3 to 7 carbon atom containing alkyl diol and an assisting polymer in a mutual solvent for said polymers to form fine droplets and allowing the droplets to dry into a fine powder, said assisting polymer being soluble in a solvent which is a non-solvent for the polyester resin and thereafter leaching the assisting polymer.

17. The method defined in claim 16 wherein the assisting polymer is polyvinyl alcohol or polyvinyl pyrrolidone.

* * * * *